(12) United States Patent
Yamashita

(10) Patent No.: US 9,020,281 B2
(45) Date of Patent: Apr. 28, 2015

(54) GHOST DETECTION DEVICE AND IMAGING DEVICE USING THE SAME, GHOST DETECTION METHOD AND GHOST REMOVAL METHOD

(75) Inventor: Toshiyuki Yamashita, Tokyo (JP)

(73) Assignee: Konika Minolta Advanced Layers, Inc., Tokyo (JP)

( * ) Notice: Subject to any disclaimer, the term of this patent is extended or adjusted under 35 U.S.C. 154(b) by 331 days.

(21) Appl. No.: 13/581,762

(22) PCT Filed: Feb. 18, 2011

(86) PCT No.: PCT/JP2011/000906
§ 371 (c)(1),
(2), (4) Date: Aug. 29, 2012

(87) PCT Pub. No.: WO2011/108207
PCT Pub. Date: Sep. 9, 2011

(65) Prior Publication Data
US 2012/0321203 A1 Dec. 20, 2012

(30) Foreign Application Priority Data

Mar. 1, 2010 (JP) ................................. 2010-044214
Mar. 1, 2010 (JP) ................................. 2010-044215

(51) Int. Cl.
| | | |
|---|---|---|
| G06K 9/62 | (2006.01) | |
| G03B 43/00 | (2006.01) | |
| G06T 5/00 | (2006.01) | |
| H04N 1/58 | (2006.01) | |
| H04N 17/00 | (2006.01) | |
| G03B 35/12 | (2006.01) | |

(52) U.S. Cl.
CPC ............... *G03B 43/00* (2013.01); *G03B 35/12* (2013.01); *G06T 5/005* (2013.01); *H04N 1/58* (2013.01); *H04N 17/002* (2013.01)

(58) Field of Classification Search
None
See application file for complete search history.

(56) References Cited

U.S. PATENT DOCUMENTS

| 6,532,008 | B1 * | 3/2003 | Guralnick ..................... 345/419 |
|---|---|---|---|
| 8,279,285 | B2 * | 10/2012 | Imai .............................. 348/162 |
| 2006/0268104 | A1 * | 11/2006 | Cowan et al. .................. 348/42 |
| 2009/0251534 | A1 | 10/2009 | Fujimoto et al. |
| 2012/0293685 | A1 * | 11/2012 | Garten ....................... 348/229.1 |

FOREIGN PATENT DOCUMENTS

| JP | 2004-272578 A | 9/2004 |
|---|---|---|
| JP | 2005-323180 A | 11/2005 |

(Continued)

OTHER PUBLICATIONS

International Search Report in PCT/JP2011/000906 dated Mar. 15, 2011, 1 page.

*Primary Examiner* — Vikkram Bali
(74) *Attorney, Agent, or Firm* — Brinks Gilson & Lione

(57) ABSTRACT

Two imaging optical systems are provided. The two imaging optical systems are configured to have a difference in a ghost appearance condition under the same imaging condition by differentiating at least one of the angle, the resolution, and the variation adjustment in production. In Step S1, images captured by the two imaging optical systems are stored. In Step S2, corresponding positions of each respective portion of a subject between the two imaging optical systems are obtained. In Step S3, images at the corresponding positions are compared with each other for determining a bright portion having a deviation in a luminance value, as a ghost portion. In this configuration, it is possible to accurately detect a ghost generation position on a real-time basis.

16 Claims, 10 Drawing Sheets

(56) References Cited

FOREIGN PATENT DOCUMENTS

| | | |
|---|---|---|
| JP | 2007-281989 A | 10/2007 |
| JP | 2008-054206 A | 3/2008 |
| JP | 2008-123137 A | 5/2008 |
| JP | 2008-289034 A | 11/2008 |

* cited by examiner

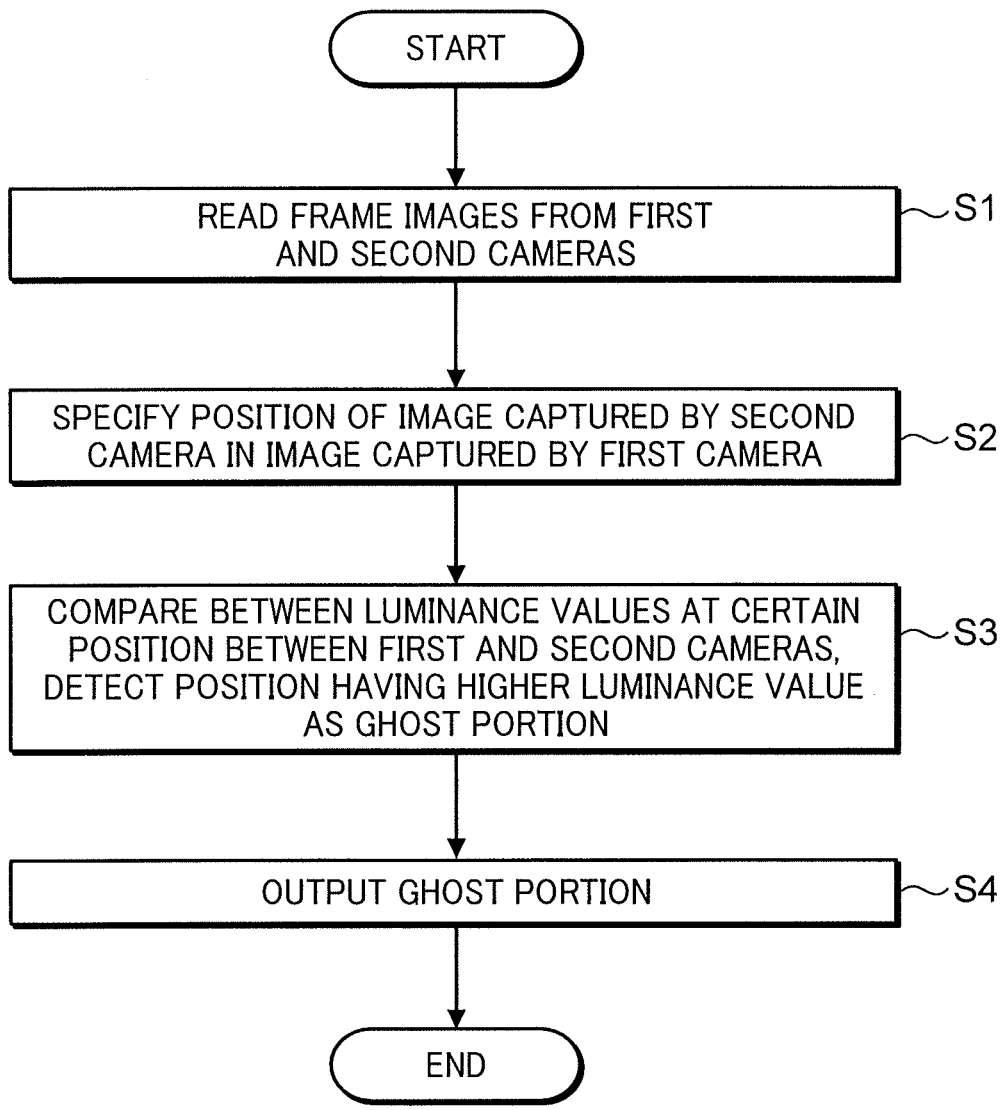

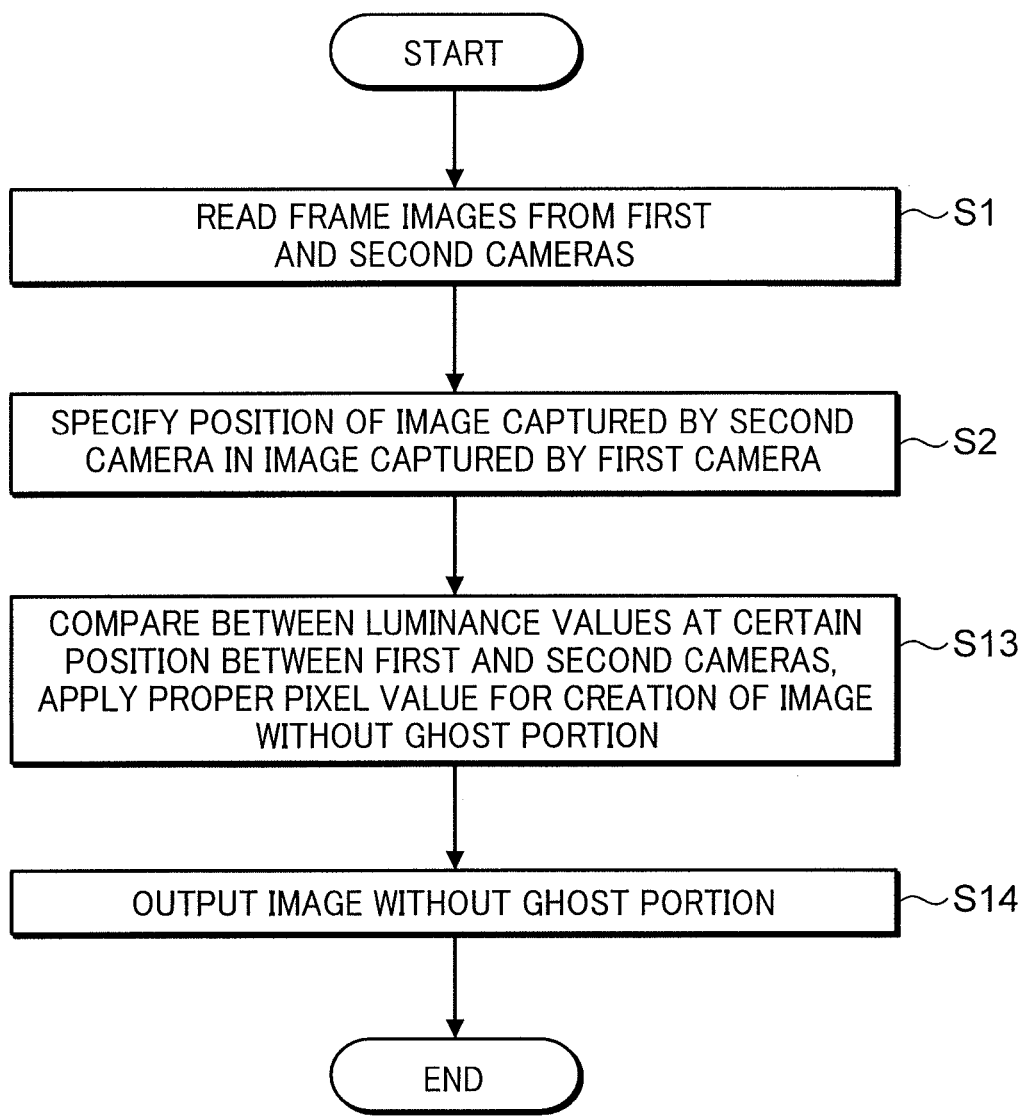

I1 PRIMARY IMAGE (HIGH RESOLUTION)

COMPARE WITH SAME RESOLUTION

I2 SECONDARY IMAGE (ENLARGED)

ENLARGE

I2' SECONDARY IMAGE (LOW RESOLUTION)

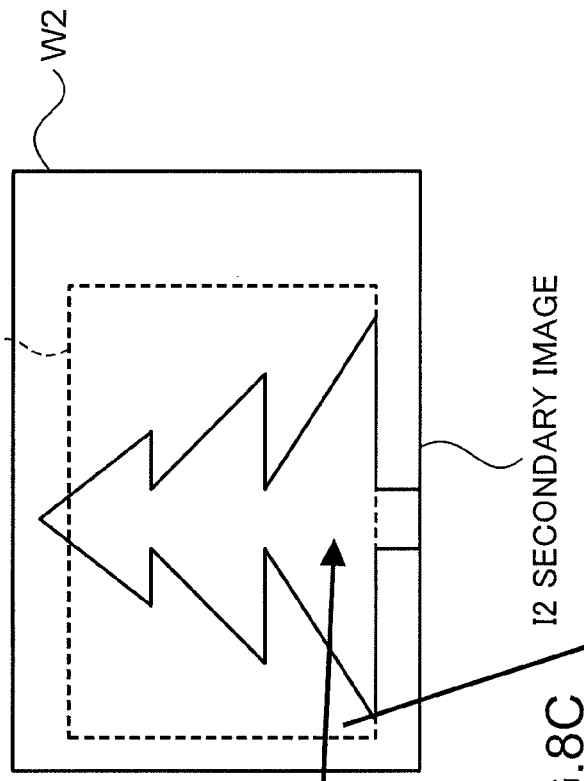
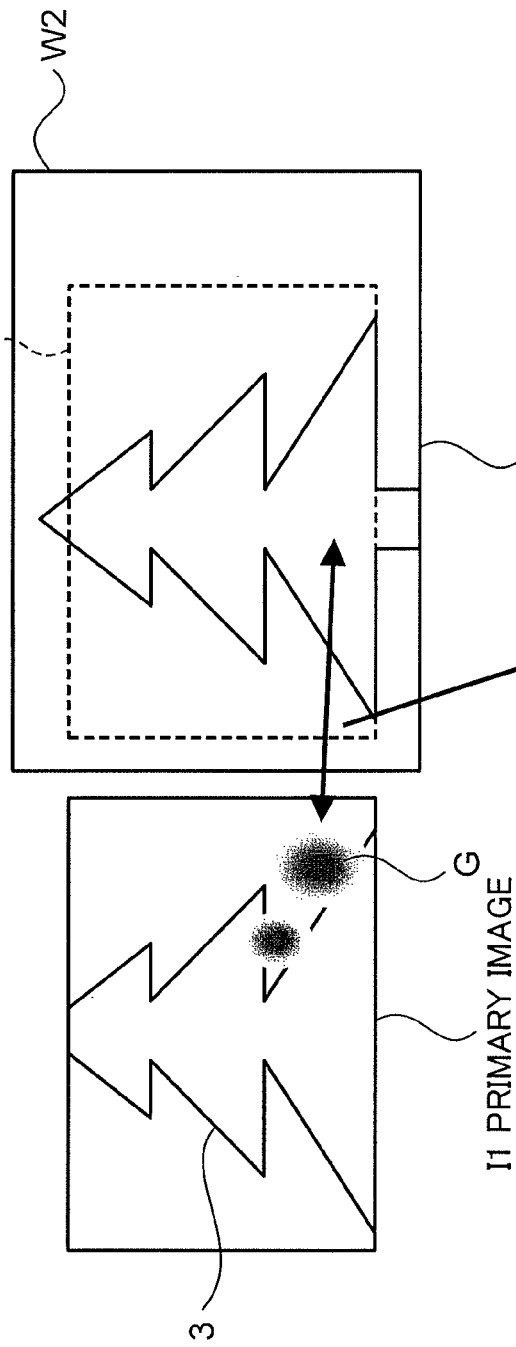
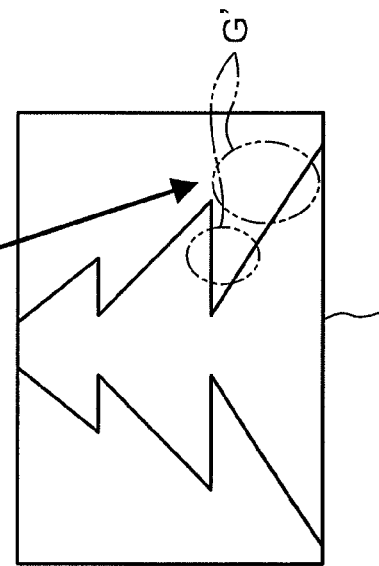

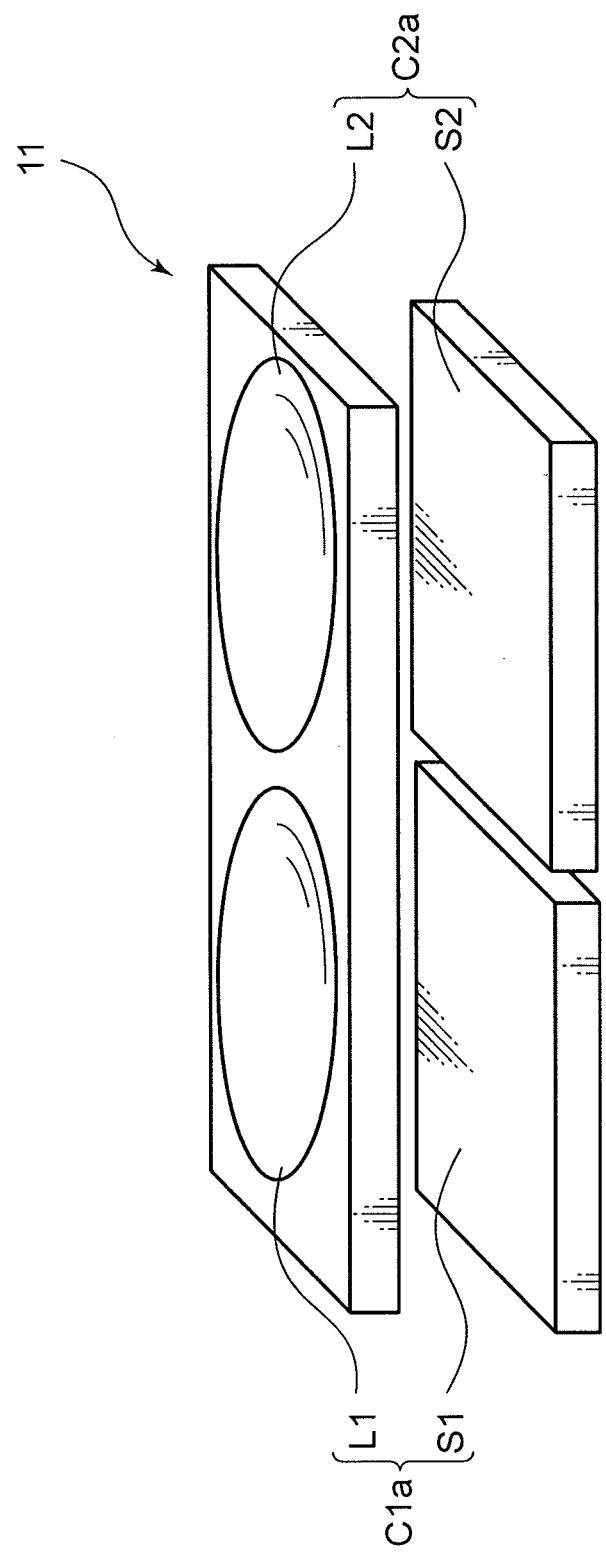

# GHOST DETECTION DEVICE AND IMAGING DEVICE USING THE SAME, GHOST DETECTION METHOD AND GHOST REMOVAL METHOD

TECHNICAL FIELD

The present invention relates to a method and device for detecting a ghost for an imaging device, an imaging device incorporated with the ghost detection device, and a ghost removal method.

BACKGROUND ART

In the imaging device, in the case where a ghost is removed, conventionally, as disclosed in e.g. patent literature 1, the position of a light source is estimated by a certain method, and a ghost portion is presumably determined by simulation based on the estimated position of the light source for ghost removal. On the other hand, patent literature 2 proposes a method for estimating a ghost portion by estimating the position of a light source by changing a focus position or moving a camera platform.

In the method disclosed in patent literature 1, detection precision of ghosts involves position measurement precision of a light source or precision of simulation. A cost and a time are required for obtaining high precision. Further, the method for estimating the position of a light source has the premise that an image of the light source is included in a captured image, and in the case where an image of the light source is not included, detection is impossible. Further, in the method disclosed in patent literature 2, ghost detection on a real-time basis is impossible.

CITATION LIST

Patent Literature

Patent Literature 1: Japanese Unexamined Patent Publication No. 2008-289034
Patent Literature 2: Japanese Unexamined Patent Publication No. 2008-54206

SUMMARY OF INVENTION

An object of the invention is to provide a ghost detection device that enables to accurately detect a ghost generation position on a real-time basis, an imaging device incorporated with the ghost detection device, and a ghost detection method.

A ghost detection device of the invention includes two imaging optical systems having ghost appearance conditions different from each other under the same imaging condition; and a ghost determining section which determines a ghost portion by comparing images captured by the two imaging optical systems in imaging ranges equal to each other.

In the invention having the above elements, it is possible to accurately detect a ghost generation position on a real-time basis.

BRIEF DESCRIPTION OF DRAWINGS

FIG. 3 is a flowchart for describing a ghost detection operation to be performed by the image processor;
FIG. 4 is a flowchart for describing a ghost removal operation to be performed by the image processor;
FIGS. 8A-C illustrate a diagram for describing a ghost portion determination and ghost removal method embodying the invention;
FIG. 9 is a perspective view showing a schematic arrangement of a camera in an imaging device employing a ghost detection and removal method as another embodiment of the invention.

DESCRIPTION OF EMBODIMENTS

First Embodiment

Figure 1:
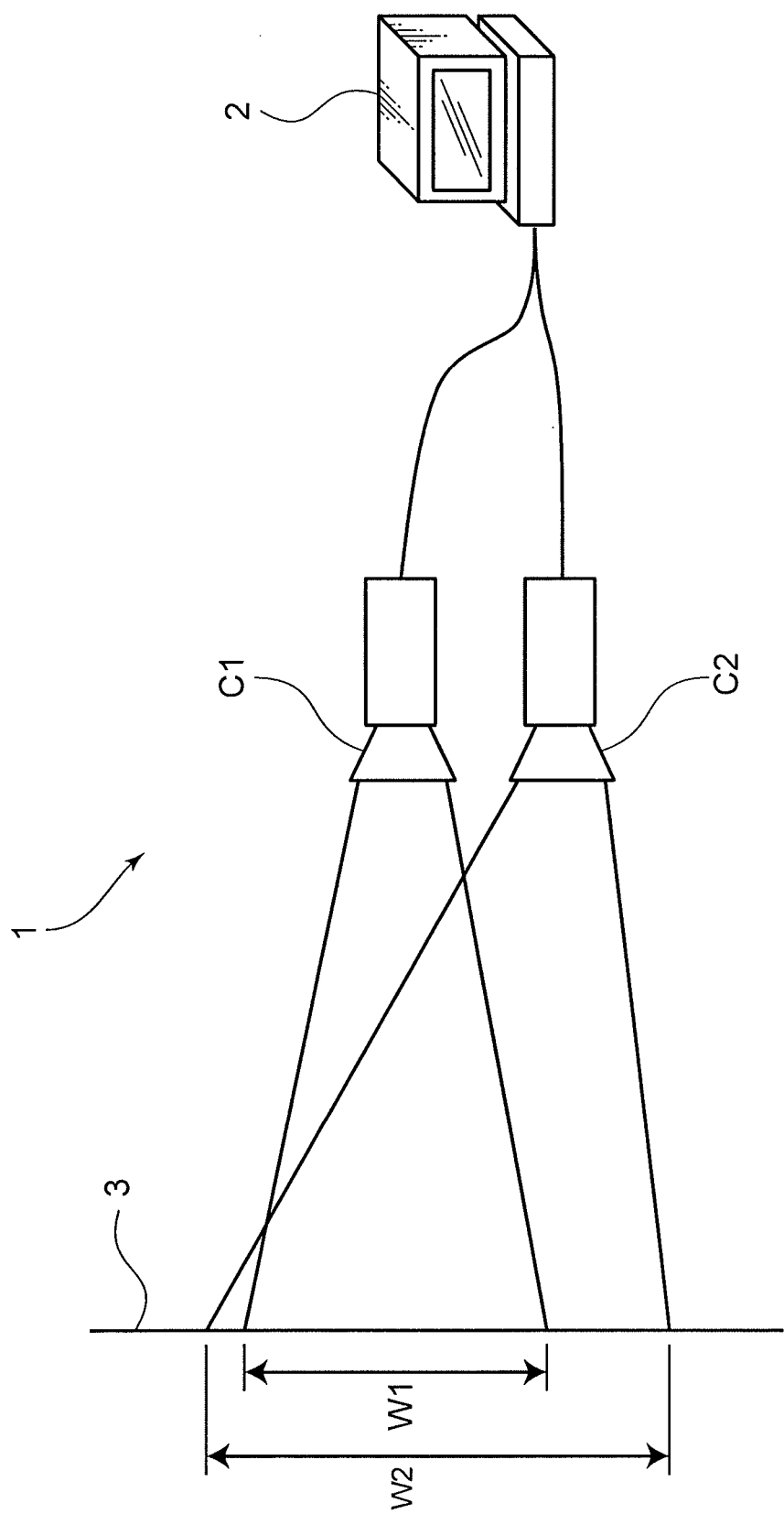
FIG. 1 is a block diagram of an imaging device employing a ghost detection and removal method embodying the invention.

FIG. 1 is a block diagram of an imaging device 1 employing a ghost detection and removal method embodying the invention. The imaging device 1 is implemented as e.g. a digital still camera or movie camera, and has a function of detecting ghosts and outputting a captured image after ghost removal. The imaging device 1 is provided with a first camera C1 as a main imaging optical system, a second camera C2 as a sub imaging optical system, and an image processor 2 including a ghost determining section for performing the ghost detection and removal.

The embodiment has a feature that ghost appearance conditions differ from each other between the first and second cameras C1 and C2 in one imaging condition. Specifically, the cameras C1 and C2 are configured in such a manner that ghost appearance conditions differ from each other by differentiating at least one of the angle (angle of view, optical axis direction), the resolution (lens groups, the number of lens, other configurations), and the method for adjusting a variation in products, even if an image is captured in the one imaging condition (a condition that an image of a subject is captured substantially in the same direction as each other).

For instance, the first camera C1 constitutes the main imaging optical system capable of capturing an image with fine quality from a wide-angle end to a telephoto end, and the second camera C2 constitutes the sub imaging optical system, which is inexpensive, is loadable on a terminal device of a mobile phone, and has a relatively wide angle end. In this case, even if an image of a subject 3 is captured substantially in the same direction as each other, a ghost is likely to be generated at a wide angle end of the first camera C1 having a configuration of a large number of lens group or lens and a high resolution, as compared with the second camera C2. On the other hand, even if the first and second cameras C1 and C2 have imaging optical systems substantially the same as each other, if the angle of view or the angle in the optical axis direction changes, a difference is generated in the ghost appearance condition between the first and second cameras C1 and C2. Further, even in the case where the first and second cameras C1 and C2 have imaging optical systems substantially the same as each other, and are manufactured in respective predetermined tolerance ranges, a variation in products is unavoidable. In mounting the imaging optical system in a lens barrel in such a manner as to reduce the variation, a difference in the ghost appearance condition is generated between the first and second cameras C1 and C2 by turning a lens by 180 degrees.

Figure 2:
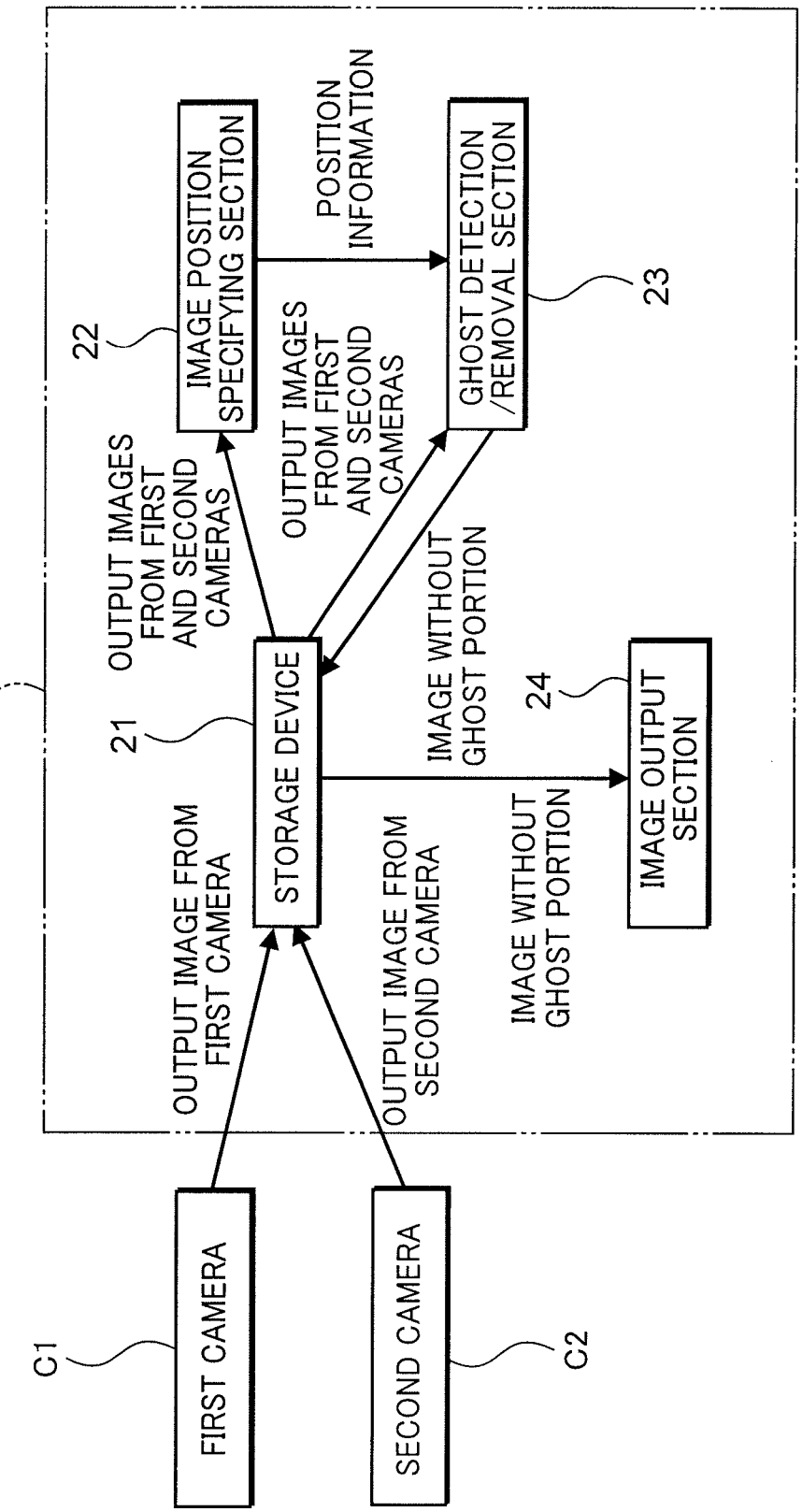
FIG. 2 is a block diagram showing a functional configuration of an image processor in the imaging device.

The image processor 2 determines a ghost portion to remove the ghost by comparing two images with each other in imaging ranges substantially equal to each other, the two images having been captured by the first and second cameras C1 and C2 and which have a difference in the ghost appearance condition. FIG. 2 is a block diagram showing a functional configuration of the image processor 2. The image processor 2 is provided with a micro processor and peripheral circuit devices which are loaded in the digital still camera or movie camera (FIG. 1 illustrates an example that a personal computer is used, but the embodiment includes an example that the invention is applied to a ghost detection device to be described later).

Referring to FIG. 2, the image processor 2 is provided with a storage device 21 which temporarily stores captured images by the first and second cameras C1 and C2; an image position specifying section 22 which specifies a corresponding position of the subject 3 in the two captured images; a ghost detection/removal section 23 which compares between imaging ranges substantially equal to each other in the two captured images, based on image position information obtained by the image position specifying section 22, determines a bright portion having a deviation in a luminance value as the ghost portion, and creates an image without the ghost portion for outputting the image to the storage device 21; and an image output section 24 which reads and outputs the image without the ghost portion from the storage device 21, as necessary. In the digital still camera or movie camera, an image without a ghost portion to be outputted from the image output section 24 is stored in e.g. a memory card or a hard disk device, as necessary. As the image without a ghost portion is read from the storage device 21, an original image corresponding to the image without a ghost portion is erased from the storage device 21.

FIG. 3 and FIG. 4 are flowcharts for describing a processing operation to be performed by the image processor 2. FIG. 3 shows a ghost detection operation, and FIG. 4 shows a ghost removal operation, respectively. Referring to FIG. 3 and FIG. 4, in Step S1, one frame of a captured image from the first camera C1 and one frame of a captured image from the second camera C2 are stored in the storage device 21. In Step S2, the image position specifying section 22 specifies what position of the image captured by the second camera C2 as the sub imaging optical system, each portion of the subject 3 in the image captured by the first camera C1 as the main imaging optical system falls at by pattern matching as an example of a corresponding point searching method to be descried later.

Then, in the ghost detection processing shown in FIG. 3, in Step S3, the ghost detection/removal section 23 compares luminance values of a certain portion of the subject 3 which is identical to each other in the two captured images, determines that ghost is generated in the case where a difference in the luminance value is equal to or larger than a predetermined value, determines a portion having a higher luminance value as a ghost portion, and outputs the ghost portion in Step S4.

On the other hand, in the ghost removal processing shown in FIG. 4, in Step S13, the ghost detection/removal section 23 compares luminance values of the certain portion of the subject 3 which is identical to each other in the two captured images, determines that ghost is generated in the case where a difference in the luminance value is equal to or larger than a predetermined value, creates an image without a ghost portion by applying a lower luminance value, and outputs the image without the ghost portion in Step S14.

Figure 5A:
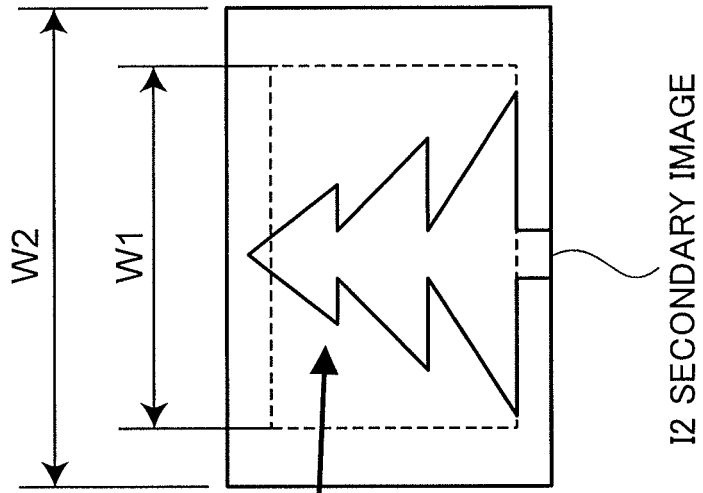
FIGS. 5A and B illustrate a diagram for describing a method for specifying an image position by an image position specifying section of the image processor.
Figure 5B:
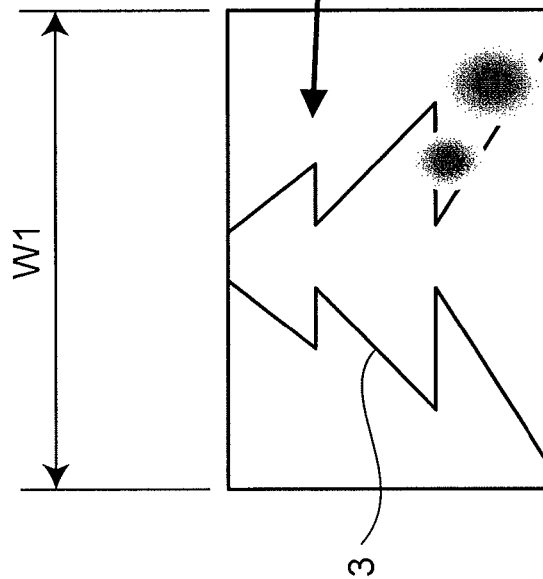

FIG. 5 is a diagram for describing a method for specifying an image position by the image position specifying section 22. For instance, as shown in FIG. 1, let us assume that W1 is an imaging range of the first camera C1 as the aforementioned high-resolution main imaging optical system, W2 is an imaging range of the second camera C2 as a low-resolution sub imaging optical system, and W1 and W2 have such a relation that W1 is included in W2 as shown in FIG. 1. Then, the captured images are as shown in FIG. 5A and FIG. 5B, respectively. The image position specifying section 22 sets the captured image by the first camera C1 as a primary image I1, sets the captured image by the second camera C2 as a secondary image I2, and correlates characterizing points similar to each other in the captured images by the aforementioned corresponding point searching method to specify what position of each of the two images, each portion of the subject 3 falls at.

Figure 6A:
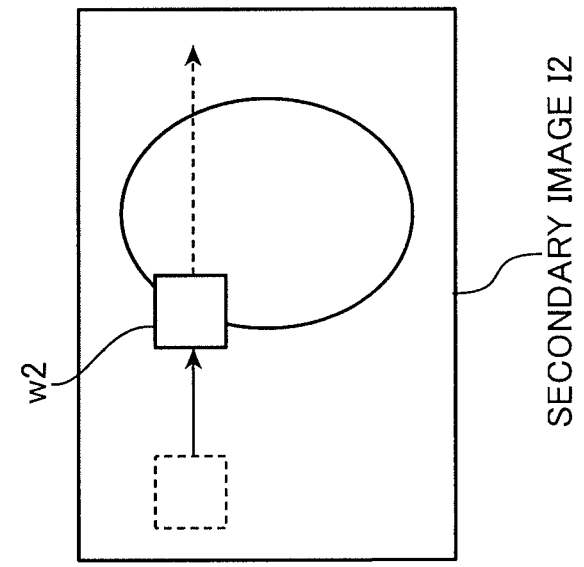
FIGS. 6A and B illustrate a diagram for describing a corresponding point searching method.
Figure 6B:
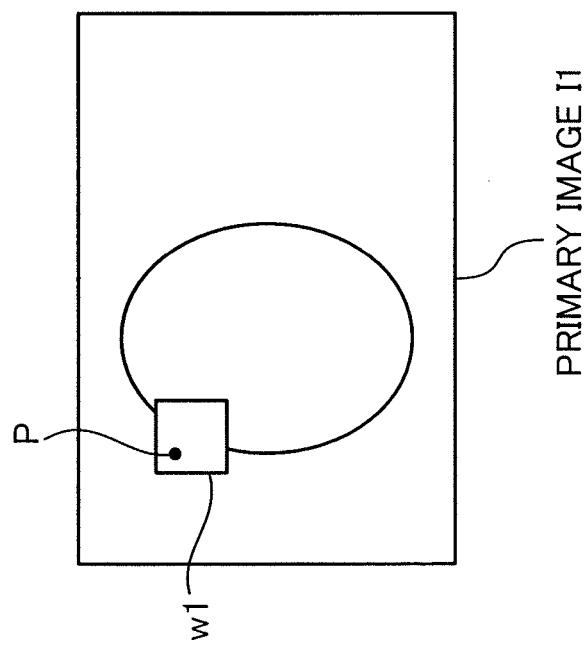

The corresponding point searching method is a method comprising: calculating a degree of similarity at plural corresponding point candidate positions in the secondary image I2 shown in FIG. 6B, with respect to a target point P in the primary image I1 shown in FIG. 6A, and detecting a corresponding point candidate position having a highest degree of similarity. Specifically, a searching operation is performed to search what position of the secondary image I2 shown in FIG. 6B, the target point P (a pixel or a pixel block composed of pixels) in the primary image I1 shown in FIG. 6A falls at by changing the position to be searched in a baseline direction in the secondary image I2 starting from positions identical to each other between the primary image I1 and the secondary image I2; and correlation computation is performed at each of the searching positions. After the correlation computation is finished with respect to all the pixels, a peak of the similarity degree having a largest degree of similarity (reliability) in the secondary image I2 is searched with respect to the target point P set in the primary image I1, based on the correlation value.

In searching what position of the secondary image I2 an image portion of the primary image I1 falls at, a window w1 having the dimensions corresponding to a certain number of pixels in length and breadth directions is set in the primary image I1, and likewise, a window w2 having the same dimensions as the window w1 is set in the secondary image I2. Then, computation for obtaining a correlation value R(x, y) is performed by the following formula at each searching position, starting from positions identical to each other in the window w1 in the primary image I1 and the window w2 in the secondary image I2 and by changing the searching position in a certain range in the baseline direction in the secondary image I2. In the computations, brightness $I_1(i, j)$, $I_2(i, j)$ at pixels corresponding to each other and having a certain coordinate (i, j) in the windows w1 and w2 are used.

$$R(x, y) = \sum_i \sum_j |I_1(i, j) - I_2(i-x, j-y)|^2$$

In the case where the dimensions and the directions of captured images by the first and second cameras C1 and C2 differ from each other, as in the case where the main imaging optical system and the sub imaging optical system are used, the image position specifying section 22 obtains imaging ranges and resolutions substantially equal to each other by performing at least one of enlargement or reduction, deformation and rotation with respect to at least one of the images in comparing the images captured by the first and second cameras C1 and C2 for making the imaging ranges or resolutions to be compared substantially equal to each other.

Figure 7C:
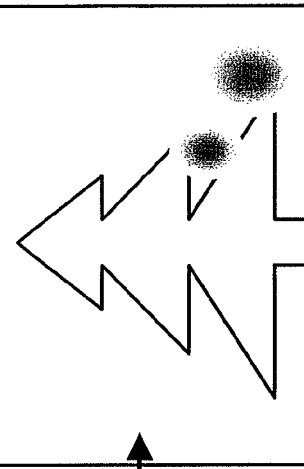
FIGS. 7A-C illustrate a diagram for describing a manner as to how a resolution (screen size) is converted.
Figure 7B:
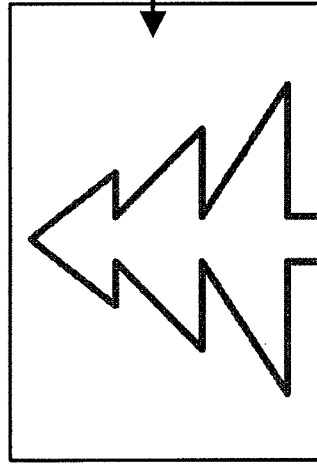
Figure 7A:
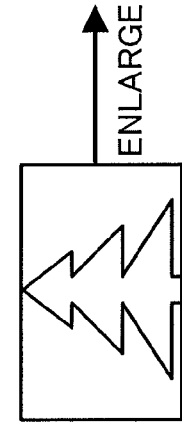

For instance, let us assume that a secondary image I2 as shown in FIG. 7B, which is obtained by enlarging a low-resolution secondary image I2' as shown in FIG. 7A, is an actual comparative image to be compared with a high-resolution primary image I1 as shown in FIG. 7C. A transformation method of a coordinate position in the case where enlargement and reduction are performed may be performed by affine transformation, which is expressed as follows. In the formula, (x', y') is an xy coordinate position after enlargement or reduction, (x, y) is an xy coordinate position before enlargement or reduction (i.e. before transformation), "a", "b", "c" and "d" are transformation parameters, and "s" and "t" are shift amounts.

$$\begin{bmatrix} x' \\ y' \end{bmatrix} = \begin{bmatrix} a & b \\ c & d \end{bmatrix} \begin{bmatrix} x \\ y \end{bmatrix} + \begin{bmatrix} s \\ t \end{bmatrix}$$

In the case where a corresponding position of each portion of the subject 3 in the primary image I1 is determined in the secondary image I2, as a result of the aforementioned corresponding point searching operation, as shown in FIG. 8A and FIG. 8B, the ghost detection/removal section 23 compares luminance values at a certain portion of the subject 3 which is identical to each other between the two captured images I1 and I2; determines that ghost is generated in the case where a luminance value difference is equal to or larger than a predetermined value; and determines a portion having a higher luminance value as a ghost portion, as shown by the reference sign G in FIG. 8A. Further, the ghost detection/removal section 23 is operable to obtain a high-resolution primary image I1' without a ghost portion G, as shown by the reference sign G' in FIG. 8C, by applying a lower luminance value to the portion where the luminance value difference is equal to or larger than the predetermined value.

As described above, the imaging device 1 of the embodiment is provided with the two cameras C1 and C2 in e.g. a digital still camera or movie camera for ghost detection or removal. The resolution (resolution performance) such as the lens group configuration or the lens group number is differentiated between the cameras C1 and C2 to thereby make a difference in the appearance condition of a ghost portion G, even if an image of the subject 3 is captured in one imaging condition (a condition that an image of the subject 3 is captured substantially in the same direction as each other) by the cameras C1 and C2. The image processor 2 compares the captured images I1 and I2 by the two cameras C1 and C2 in the imaging ranges W1 substantially equal to each other in by pattern matching; determines a bright portion having a deviation in the luminance value, as a generation position of a ghost portion G, as shown in FIG. 8A; and creates a captured image I1' without the ghost portion G that has been generated in the bright portion, as indicated by the reference sign G', by replacing an image at the bright portion with an image at the same subject position (namely, a dark portion) captured by the other camera, as shown in FIG. 8B. Accordingly, it is possible to accurately determine the generation position of a ghost portion G on a real-time basis, and to accurately create the captured image I1' without a ghost portion G on a real-time basis.

In other words, by performing comparison between the images I1 and I2 viewed from different viewpoints from each other, a position of the ghost portion G is detected for removal of the ghost portion G. Accordingly, the aforementioned arrangement is advantageous in constantly determining the ghost portion G mainly by e.g. moving image photographing or a preview screen, and in continuing the ghost removal operation. Unlike the photographing method of changing the angle by a single camera as disclosed in patent literature 2, the embodiment proposes a practical method suitable for an actual use condition. Thus, it is possible to implement the imaging device 1 capable of accurately detecting a generation position of the ghost portion G on a real-time basis for ghost removal.

As described above referring to FIG. 7, in the case where the dimensions and the directions of the captured images I1 and I2' differ from each other, and at least one of enlargement or reduction, deformation and rotation of the secondary image I2' is performed as in the case where the main and sub imaging optical systems are used, particularly, in the case where enlargement as shown in FIG. 7A to FIG. 7B is performed, if a low luminance value is simply applied for removal of a ghost portion G, the resolution of the image 11' after the ghost removal may be degraded. In such a case, a difference between an average value ave(I2) of luminances in the vicinity of the generation position of a ghost portion G in the secondary image I2, and an average value ave(I1) of luminances in the vicinity of the generation position of a ghost portion G in the primary image I1, is subtracted from a luminance value I1 (i, j) of the primary image I1. In other words, assuming that "x" and "y" respectively denote shift amounts in x-direction and in y-direction, an output image I1'(i, j) can be obtained by the following formula.

$$I1'(i,j)=I1(i,j)-\{\text{ave}(I1(i,j))-\text{ave}(I2(i-x,j-y))\}$$

In the above configuration, it is possible to use the main and sub imaging optical systems which are configured to have a difference in the dimensions and the performance between the first and second cameras C1 and C2 for detection of a ghost portion G. Thus, it is possible to manufacture the sub imaging optical system (second camera C2) which is additionally provided for detection and removal of a ghost portion G with a simplified construction and at a low cost.

On the other hand, the second camera C2 to be additionally provided for detection and removal of a ghost portion G as described above is provided with a fovea lens in the imaging optical system thereof. In this configuration, even if the imaging range W1 of the first camera C1 is included in the imaging range W2 of the second camera C2, it is possible to detect a ghost portion G with high-precision, with a relatively high resolution performance (resolution) in the center or the vicinity of a subject image. Accordingly, it is possible to reduce the enlargement processing as described above, while securely detecting a ghost portion G. An example of the fovea lens is disclosed in e.g. Japanese Unexamined Patent Publication No. 2004-272578 filed by the applicant of the present application.

Further, the image position determining section 22 may hold a corresponding position during a predetermined period, in place of searching a corresponding position by the aforementioned corresponding point searching method, each time the images I1 and I2 are captured. Further alternatively, in the case where a corresponding position does not change by e.g. fixing the focal lengths of the first and second cameras C1 and C2, a relationship between corresponding positions may be stored in advance. The modification enables to eliminate a complicated computation for searching a corresponding point. The aforementioned corresponding point searching method, however, is advantageous in performing high-precision ghost detection, because positioning by pattern matching is performed.

Furthermore, assuming that F1 is an optical focal length of the first camera C1, S1 is a size (diagonal length) of an imaging element of the first camera C1, F2 is an optical focal length of the second camera C2, and S2 is a size of an imaging element of the second camera C2, the following relationship is defined for the first and second cameras C1 and C2.

$$S1/F1 \leq S2/F2$$

In the above case, the numerical aperture (NA) of the second camera C2 increases. Accordingly, as described above, the resolution performance (resolution) of the first camera C1 increases, thereby configuring the first and second cameras C1 and C2 respectively as the sub imaging optical system and the main imaging optical system as described. Thus, the imaging range (angle of view, field of view) W1 of the first camera C1 is included in the imaging range W2 of the second camera C2.

In the case where the first camera C1 having a high resolution performance (resolution) is configured to be zoomable, however, the aforementioned formula is satisfied when the optical focal length F1 lies in a predetermined range corresponding to a short focal length side. Specifically, when the optical focal length F1 is on a long focal length side in which generation of a ghost portion G1 is less likely to occur, the constraint of the aforementioned formula is released. In the above configuration, even if the second camera C2 has a fixed focal length, it is not necessary to excessively increase the numerical aperture (NA) of the second camera C2, and therefore, it is not necessary to excessively reduce the resolution performance (resolution) of the second camera C2. In the above configuration, it is possible to detect and remove ghost with high-precision by the first camera C1 having a zoom optical system, even in use of the aforementioned simplified optical system having a fixed focal length, which is loadable on the aforementioned terminal device of a mobile phone.

Second Embodiment

FIG. 9 is a perspective view showing a schematic configuration of a camera 11 in an imaging device employing a ghost detection and removal method as another embodiment of the invention. The camera 11 is provided with two optical systems (compound eye lenses) C1a and C2a substantially identical to each other. The optical system C1a is provided with a lens L1 and an imaging element S1, and the optical system C2a is provided with a lens L2 and an imaging element S2. The second embodiment has a feature that the two lenses L1 and L2 are integrally formed. In this configuration, it is possible to adjust the angle (angle of view, optical axis direction) of the two imaging optical systems C1a and C2a at one time.

The above arrangement is advantageous in determining corresponding points in two captured images I1 and I2 in advance by fixing the focal lengths of the two optical systems C1a and C2a, forming the two optical systems C1a and C2a into one unit, and properly performing calibration.

Figure 10:
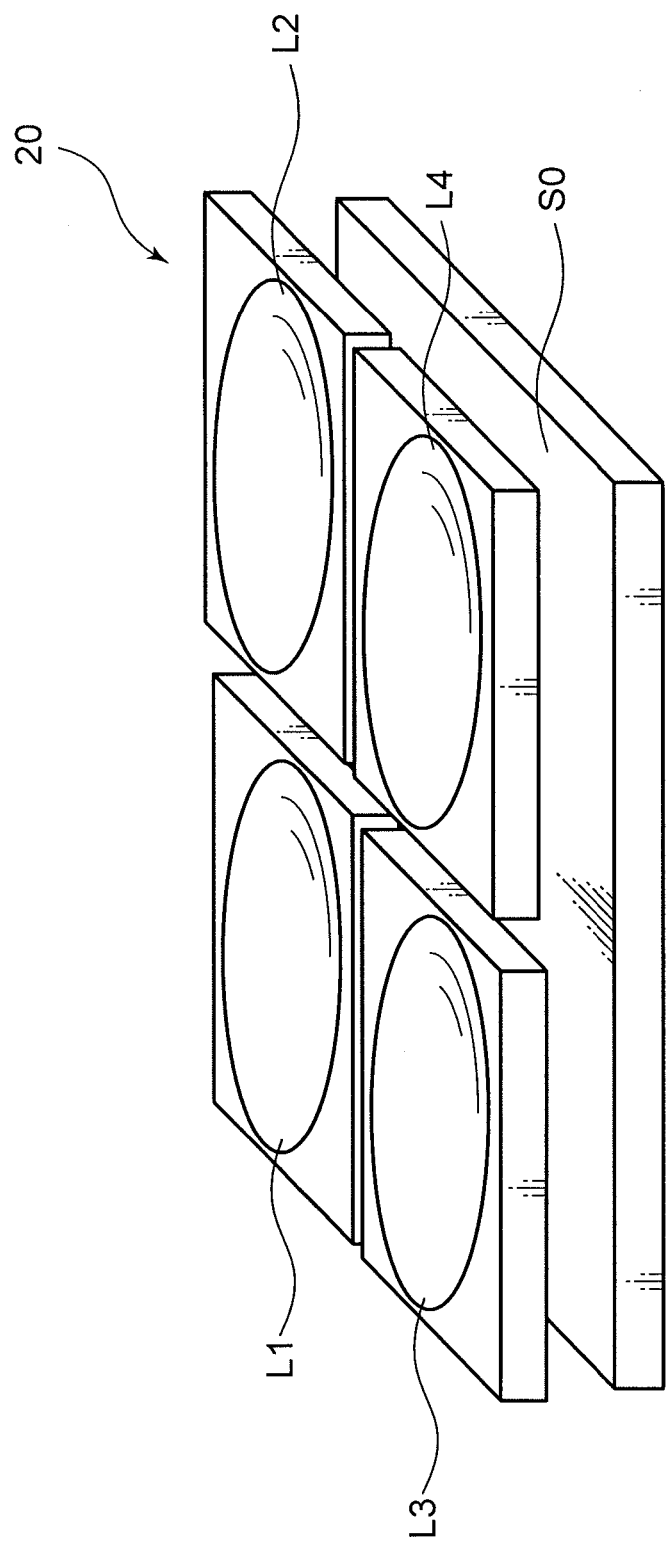
FIG. 10 is a perspective view showing a schematic arrangement of a camera in an imaging device employing a ghost detection and removal method as yet another embodiment of the invention.

Alternatively, as shown by a camera 20 in FIG. 10, an imaging element S0 may be divided into areas, and plural (four in FIG. 10) lenses L1 through L4 may be provided for the imaging element S0. In this configuration, it is possible to suppress displacement in a projection position in each of the imaging optical systems resulting from aging deterioration.

Further, in the case where the imaging device is provided with three or more imaging optical systems, as shown by the camera 20 in FIG. 10, it is possible to configure a so-called stereo camera by configuring two of the imaging optical systems identical to each other, so that the other of the imaging optical systems is allowed to perform detection and removal of ghost for the two imaging optical systems of the stereo camera. Further alternatively, it is possible to further enhance the precision by providing three or more imaging optical systems similar to each other and allowing any two of the imaging optical systems to perform ghost detection and removal.

In this example, as shown in FIG. 1, by configuring the first and second cameras C1 and C2 as imaging optical systems, and the image processor 2 as a ghost determining section into structures separable from each other, it is possible to function the image processor 2 as a ghost inspection device for the two cameras C1 and C2, and to inspect how ghost appears in the two cameras C1 and C2 at the time of manufacturing lenses and the like. Further, in the case where the imaging device 1 is configured to perform only detection of a ghost portion G, merely the processing shown in FIG. 3 may be performed; and in the case where the imaging device 1 is configured to perform only ghost removal, merely the processing shown in FIG. 4 is performed.

A ghost detection device of the invention includes two imaging optical systems having ghost appearance conditions different from each other under the same imaging condition; and a ghost determining section which determines a ghost portion by comparing images captured by the two imaging optical systems in imaging ranges equal to each other.

The ghost detection device of the invention further includes a ghost removal section which creates an image to remove the ghost portion determined by the ghost determining section.

Further, in the ghost detection device of the invention, the ghost removal section removes the ghost portion by replacing or correcting the ghost portion of the image captured by the one imaging optical system with an image portion of the image captured by the other imaging optical system, the image portion being at the same position of the subject.

Further, in the ghost detection device of the invention, the ghost determining section determines a portion of the image having a luminance value difference equal to or larger than a predetermined value by comparing with the other of the images captured by the two imaging optical systems, as the ghost portion.

Further, in the ghost detection device of the invention, the two imaging optical systems are different from each other in at least one of the imaging range, the resolution, and the variation adjustment in production.

In the above configurations, the two imaging optical systems are provided in e.g. a digital still camera or movie camera in detecting ghost for ghost removal. Then, the two imaging optical systems are configured to have a difference in a ghost appearance condition, even if an image is captured in one imaging condition (a condition that an image of a subject is captured substantially in the same direction as each other), by differentiating at least one of the imaging range, the angle (angle of view, optical axis direction) of the imaging optical systems, the resolution (lens groups, the number of lens, and other configurations), and the method for adjusting a variation in products.

Further, the ghost determining section determines the ghost portion by comparing the images captured by the two imaging optical systems in the imaging ranges equal to each other by pattern matching. Specifically, the ghost determining section determines a bright portion having a deviation in the luminance value between images to be compared, as the ghost portion. Thus, it is possible to accurately detect a ghost generation position on a real-time basis.

Furthermore, in the ghost detection device of the invention, the ghost determining section compares the images captured by the two imaging optical systems with each other by performing at least one of enlargement, reduction, deformation and rotation with respect to at least one of the images captured by the two imaging optical systems.

In the above configuration, in the case where the dimensions and the directions of the captured images by the two imaging optical systems differ from each other, as in the case where the two imaging optical systems are e.g. a main imaging optical system and a sub imaging optical system, the ghost determining section performs at least one of enlargement or reduction, deformation and rotation with respect to at least one of the images before comparison for making the imaging ranges or resolutions to be compared substantially equal to each other.

Accordingly, even in the case where the dimensions and the directions of the captured images differ from each other, as in the case where the main and sub imaging optical systems are used, it is possible to perform comparison between the same imaging ranges for ghost detection. Further, it is possible to provide the sub imaging optical system to be additionally provided for ghost detection with a simplified construction and at a low cost, regardless of a difference in the dimensions and the performance between the imaging optical systems, as in the case where the main and sub imaging optical systems are used.

Further, in the ghost detection device of the invention, $$S1/F1 \leq S2/F2$$

where $F1$ is an optical focal length of one of the two imaging optical systems, $S1$ is a size of an imaging part of the one imaging optical system, $F2$ is an optical focal length of the other of the two imaging optical systems, and $S2$ is a size of an imaging part of the other imaging optical system In the above configuration, the numerical aperture (NA) of the other imaging optical system increases. Accordingly, the resolution performance (resolution) of the one imaging optical system increases, thereby configuring the other imaging optical system and the one imaging optical system respectively into a sub imaging optical system and a main imaging optical system. As a result, the imaging range (angle of view, field of view) of the main imaging optical system is included in the imaging range of the sub imaging optical system.

Furthermore, in the ghost detection device of the invention, the one imaging optical system is zoomable, and the optical focal length $F1$ lies in a predetermined range of a short focal length side of the one imaging optical system. In the above configuration, the one imaging optical system having a high resolution performance (resolution) as described above is provided with a zoom optical system. Then, the aforementioned formula is satisfied when the optical focal length $F1$ lies in a predetermined range corresponding to a short focal length side.

In the above configuration, by releasing the constraint of the aforementioned formula on a long focal length side in which generation of ghost is less likely to occur, it is not necessary to excessively increase the numerical aperture (NA) of the other imaging optical system, and therefore, it is not necessary to excessively reduce the resolution performance (resolution) of the other imaging optical system, even if the other imaging optical system has a fixed focal length. Thus, it is possible to detect ghost with high-precision in the one imaging optical system provided with a zoom optical system, even if a simplified optical system having the fixed focal length is used as the other imaging optical system.

Further, in the ghost detection device of the invention, the two imaging optical systems are formed into one unit. In the configuration, by forming lenses and the like into one unit, it is possible to adjust the angle (angle of view, optical axis direction) of the two imaging optical systems at one time.

Furthermore, in the ghost detection device of the invention, the imaging parts of the two imaging optical systems are area divisions of a single imaging element. In the above configuration, it is possible to suppress displacement in the two imaging optical systems resulting from aging deterioration.

Further, in the ghost detection device of the invention, the other imaging optical system is provided with a fovea lens. In the above configuration, it is possible to detect ghost with high-precision, with a relatively high resolution performance (resolution) in the center or the vicinity of a subject image, even if the imaging range of the one imaging optical system is included in the imaging range of the other imaging optical system.

Furthermore, the ghost detection device of the invention further includes a third imaging optical system having the same characteristic as the one imaging optical system. In the above configuration, it is possible to configure the one imaging optical system and the third imaging optical system into a so-called stereo camera for allowing the other imaging optical system to detect ghost in the two imaging optical systems of the stereo camera.

Further, in the ghost detection device of the invention, the two imaging optical systems and the ghost determining section are separable from each other. In the above configuration, the ghost determining section is operable to function as a ghost inspection device at the time of e.g. manufacturing two imaging optical systems such as lenses.

Furthermore, an imaging device of the invention includes the aforementioned ghost detection device. In the above configuration, it is possible to implement an imaging device that enables to accurately detect a ghost generation position on a real-time basis.

According to another aspect, the invention relates to a ghost detection method. The method includes an acquiring step of acquiring two images captured by two imaging optical systems having ghost appearance conditions different from each other under the same imaging condition; a comparing step of comparing the two images acquired in the acquiring step with each other in imaging ranges equal to each other in; and a ghost determining step of determining a portion of the image having a luminance value difference equal to or larger than a predetermined value as a result of the comparison in the comparing step, as a ghost portion.

Further, the ghost detection method of the invention further includes a ghost removing step of creating an image to remove the ghost portion determined in the determining step.

In the above configurations, there are provided the two imaging optical systems in e.g. a digital camera or movie camera for creating a captured image without a ghost portion. Then, the two imaging optical systems are configured to have a difference in a ghost appearance condition, even if an image is captured in one imaging condition (a condition that an image of a subject is captured substantially in the same direction as each other) by differentiating at least one of the angle (angle of view, optical axis direction) of the imaging optical systems, the resolution (as the lens groups, the number of lens, and other configurations) and the method for adjusting a variation in products.

Further, in the ghost removing step, it is possible to remove ghost by comparing between imaging ranges substantially equal to each other in captured images by the two imaging optical systems by e.g. pattern matching. Specifically, since a bright portion having a deviation in a luminance value between images to be compared is set as a ghost portion, a captured image without a ghost portion that has been generated in the bright portion is created by replacing or correcting the image at the bright portion with an image at the same subject position (namely, a dark portion) captured by the other imaging optical system. Thus, it is possible to accurately create a captured image without a ghost portion on a real-time basis.

INDUSTRIAL APPLICABILITY

As described above, according to the invention, it is possible to determine a ghost generation portion by using two imaging optical systems having ghost appearance conditions different from each other, and by comparing image portions substantially identical to each other in images captured by the two imaging optical systems, and to create an image with the ghost portion being removed. Thus, it is possible to accurately create a captured image without a ghost on a real-time basis.

The invention claimed is:

1. A ghost detection device comprising:
a first imaging optical system having a first optical focal length F1 and a first imaging element of size S1;
a second imaging optical system having a second optical focal length F2 and a second imaging element of size S2, whereof $$S1/F1 \leq S2/F2$$

and the first and second imaging optical systems have different ghost appearance conditions under the same imaging conditions; and
a ghost determining section which determines a shot portion by comparing a first image captured by the first imaging optical system and a second image captured by the second imaging optical system, in imaging ranges substantially equal to each other.

2. The ghost detection device according to claim 1, further comprising:
a ghost removal section which creates an image without the ghost portion determined by the ghost determining section.

3. The ghost detection device according to claim 2, wherein the ghost removal section creates the image without the ghost portion by replacing the ghost portion of the first image with an image portion of the second image, the image portion being at a same position of a subject as the ghost portion.

4. The ghost detection device according to claim 1, wherein the ghost determining section determines, as the ghost portion, a portion of the first image by comparing the first image to the second image, where the ghost portion has a luminance value difference equal to or larger than a predetermined value.

5. The ghost detection device according to claim 1, wherein the first and second imaging optical systems are different from each other with respect to at least one of an imaging range, a resolution, and a variation adjustment in production.

6. The ghost detection device according to claim 1, wherein the ghost determining section compares the first image and second image by pattern matching.

7. The ghost detection device according to claim 1, wherein the ghost determining section compares the first image and second image by performing at least one of an enlargement, reduction, deformation and rotation with respect to at least one of the first image and second image.

8. The ghost detection device according to claim 1, wherein the first imaging optical system is zoomable, and the optical focal length F1 lies in a predetermined range of a short focal length side of the first imaging optical system.

9. The ghost detection device according to claim 1, wherein the first imaging optical system and second imaging optical system are formed into one unit.

10. The ghost detection device according to claim 9, wherein the first imaging element and second imaging element are area divisions of a single imaging element.

11. The ghost detection device according to claim 1, wherein the second imaging optical system is provided with a fovea lens.

12. The ghost detection device according claim 1, further comprising:
a third imaging optical system having a same set of characteristics as the first imaging optical system.

13. The ghost detection device according to claim 1, wherein the first and second imaging optical systems and the ghost determining section are separable from each other.

14. An imaging device, comprising:
a ghost detection device, comprising:
a first imaging optical system having a first optical focal length F1 and a first imaging element of size S1;
a second imaging optical system having a second optical focal length F2 and a second imaging element of size S2, where $$S1/F1 \leq S2/F2$$

and the first and second imaging optical systems have different ghost appearance conditions under the same imaging conditions; and
a ghost determining section which determines a shot portion by comparing a first image captured by the first imaging optical system and a second image captured by the second imaging optical system, in imaging ranges substantially equal to each other,
wherein the ghost detection device detects a ghost generation position on a real-time basis.

15. A ghost detection method, comprising:
an acquiring step of acquiring a first image captured by a first imaging optical system having a first optical focal length F1 and a first imaging element of size S1 and a second image captured by a second imaging optical system having a second optical focal length F2 and a second imaging element of size S2, where $$S1/F1 \leq S2/F2$$

and the first and second imaging optical systems have different ghost appearance conditions under the same imaging conditions;
a comparing step of comparing the first image and second image in imaging ranges substantially equal to each other; and
a ghost determining step of determining, as a ghost portion, a portion of the first image having a luminance value difference equal to or larger than a predetermined value.

16. The ghost detection method according to claim 15, further comprising:
a ghost removing step of creating an image without the ghost portion determined in the ghost determining step.

* * * * *